United States Patent Office 2,905,059
Patented Sept. 22, 1959

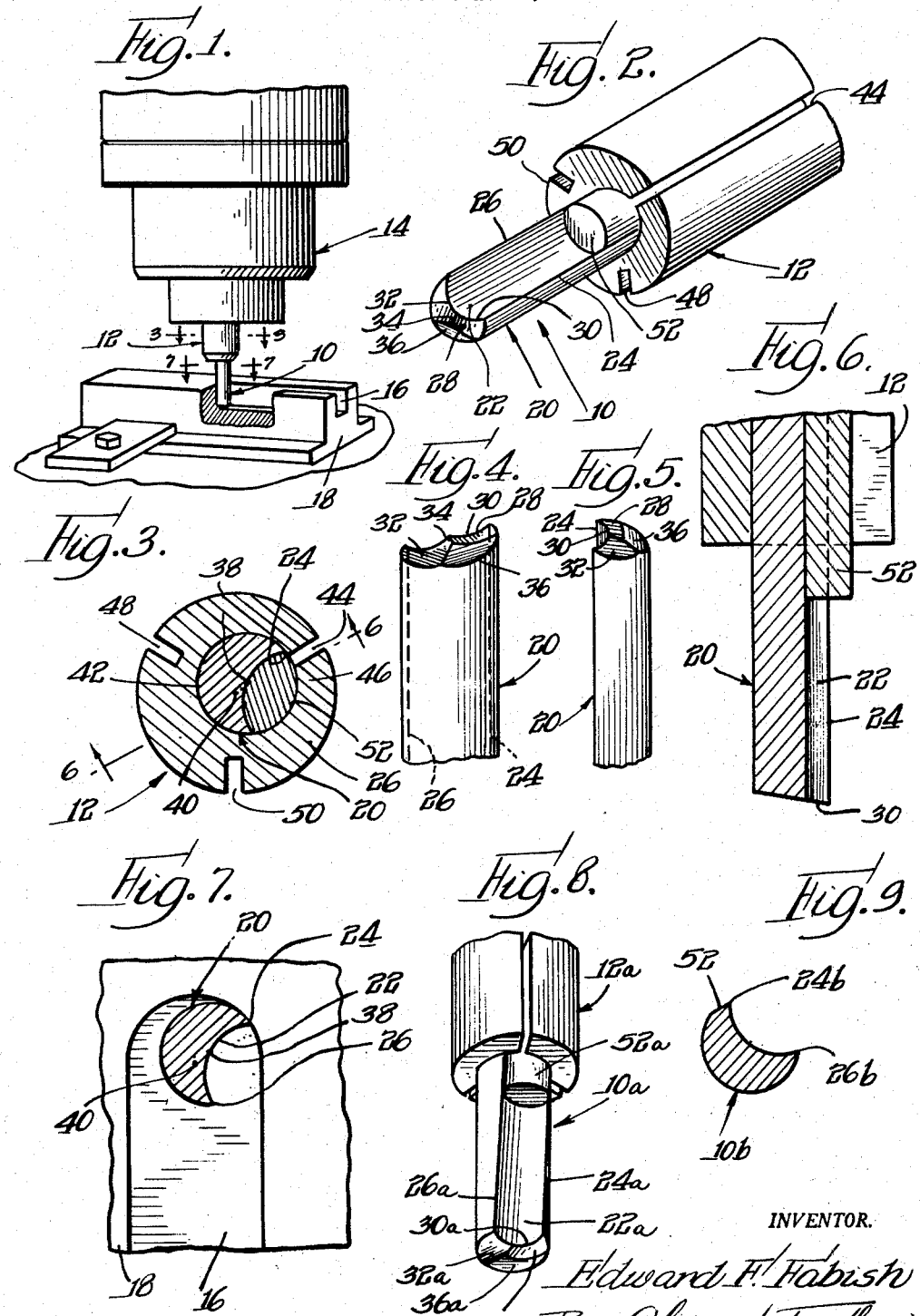
Sept. 22, 1959    E. F. FABISH    2,905,059
END MILLING CUTTER
Filed Jan. 26, 1956
INVENTOR.
Edward F. Fabish
By: Olson & Trexler
attys.

2,905,059

END MILLING CUTTER

Edward F. Fabish, Glenview, Ill., assignor to Illinois Tool Works, Chicago, Ill., a corporation of Illinois Application January 26, 1956, Serial No. 561,480

6 Claims. (Cl. 90—11)

The present invention relates to a novel cutting tool, and, more particularly, to a novel end milling cutter.

An object of the present invention is to provide a novel end milling cutter which may be easily formed and sharpened or resharpened and which is constructed so as to have a relatively long useful life.

A more specific object of the present invention is to provide a novel end milling cutter including an elongated cutter body formed so as to eliminate localized concentration of stresses which might cause breakage of the body during a cutting operation and so that the cutter may be repeatedly resharpened by simple grinding operations regardless of the amount of the body removed during previous sharpenings.

Another object of the present invention is to provide a novel end milling cutter of the above described type which may be easily adjustably retained within a collet, and also to provide a novel simplified collet capable of securely retaining end milling cutters as well as other somewhat similar tools.

Other objects and advantages of the present invention will become apparent from the following description and the accompanying drawings wherein:

Fig. 1 is a fragmentary view, partially broken away, showing an end milling cutter and collet assembly incorporating the features of the present invention mounted in a milling head and cutting a slot in a workpiece;

Fig. 2 is an enlarged perspective view showing the novel end milling cutter and collet of the present invention;

Fig. 3 is an enlarged cross sectional view taken along line 3—3 in Fig. 1;

Fig. 4 is an enlarged inverted elevational view showing a side of the novel cutter opposite from longitudinally extending edges thereof;

Fig. 5 is a view similar to Fig. 4 but showing the cutter turned 90°;

Fig. 6 is a fragmentary sectional view taken along line 6—6 in Fig. 3;

Fig. 7 is an enlarged fragmentary sectional view taken along line 7—7 in Fig. 1;

Fig. 8 is a fragmentary perspective view showing a slightly modified form of the present invention; and Fig. 9 is a cross sectional view of the cutter and shows another slightly modified form of the present invention.

Referring now more specifically to the drawings wherein like parts are designated by the same numerals throughout the various figures, a cutter 10 is shown in Fig. 1 mounted in a collet 12 which is retained in a milling head 14 so that the cutter may be rotated to form a slot 16 in a workpiece 18. As will be understood, the cutter may be utilized for forming slots of various sizes and depth and for various other purposes.

In accordance with the present invention the end milling cutter 10 comprises a length of barstock 20 having a substantially uniform cross sectional shape and dimensions throughout its length so that the bar is devoid of areas of unduly concentrated stresses that might cause breakage of the bar during a cutting operation. More specifically, the bar 20 has a circular projected cross sectional shape which is interrupted by only a single generally longitudinally extending groove 22. The surface of the groove 22 has a concave or arcuate transverse cross section which preferably has a radius substantially equal to the radius of the bar, but some deviation from this radius may be permissible for cutters to be used for certain purposes. The surface of the groove intersects the peripheral or cylindrical surface of the bar so as to provide longitudinally extending edges 24 and 26, and it should be noted that these edges are both located at one side of a plane containing the longitudinal axis of the bar and disposed perpendicular to a second plane containing the longitudinal axis of the bar and bisecting the groove. Preferably, the entire groove surface or at least a major portion thereof is located at the same side of the above first mentioned plane as the edges 24 and 26. Thus, the void provided by the groove 22 constitutes substantially less than one-half of the projected cylindrical volume of the bar.

As shown in Figs. 2, 4, 5 and 6 the groove surface intersects an end surface portion 28 of the bar to provide an end cutting edge 30. The surface portion 28 is disposed in a plane which is inclined at a relatively small angle axially inwardly from the longitudinally extending cutting edge 24 so that the cutting edge 30 is similarly inclined axially inwardly from the longitudinally extending edge. In addtion, the plane of the surface portion 28 is inclined at a relatively small angle rearwardly and axially inwardly from the edge 30 so that the edge is well supported and desired clearance is provided. In order to provide substantial clearance for chips at the end of the tool, a second end surface portion 32 is formed which intersects the surface portion 28 along a line 34 substantially at the center of the bar and which intersects the groove surface. The surface portion 32 is inclined from the line 34 axially inwardly with respect to the bar at a relatively large angle. In addition, a third surface portion 36 is formed so as to intersect the surface portion 28 well behind the end cutting edge 30, and the surface portion 36 is also inclined axially inwardly from the surface portion 28 at a relatively large angle. It will be appreciated that the end surface portions 28, 32 and 36 may be ground easily and rapidly to sharpen or resharpen the edge 30 and provide the desired clearances. It will also be appreciated that the longitudinally extending cutting edge 24 may be easily sharpened by grinding the surface of the groove 22. Furthermore, even after repeated sharpenings, the edge 24 remains at the peripheral or cylindrical surface of the bar so that the effective cutting radius of the milling cutter will not be diminished.

As shown in Figs. 2, 3, 6 and 7 the end milling cutter 10 is mounted in the collet 12 so that the longitudinal axis 38 of the cutter is offset from the axis of rotation 40 of the cutter. Thus, the cutter is rotated so as to form a groove in a workpiece wider than the diameter of the cutter.

The collet 12 is formed in one piece and is provided with an eccentric aperture 42 which, in the embodiment shown, is cylindrical for receiving the milling cutter. However, it should be understood that the collet may be adapted to accommodate milling cutters having non-circular transverse cross sections by changing the configuration of the aperture 42. A longitudinally extending slot 44 is formed entirely through the narrowest side 46 of the collet so that the collet may be collapsed when mounted in the milling head for tightly gripping the milling cutter and preventing relative rotation between the cutter and the collet. Additional and preferably equally spaced slots 48 and 50 are formed in but do not extend entirely through thicker side portions of the collet. The slots 48 and 50 which preferably extend more than one-half of the way to the aperture 42 increase the flexibility of the collet and facilitate collapsing thereof for gripping the cutter. A pin 52 having opposite sides respectively conforming substantially to the surface of the groove 22 in the cutter and the interior surface of the collet is inserted between the collet and the cutter in the manner shown for backing up and preventing undue collapsing of portions of the collet which extend over the groove in the cutter.

Fig. 8 shows an embodiment of the present invention which is similar to the above described structure as indicated by the application of the identical reference numerals with the suffix "a" added to corresponding elements. This embodiment differs in that the groove 22a and, therefore, the generally longitudinally extending edges 24 and 26 are helically formed. This arrangement presents the longitudinal cutting edge 24 to the work at an angle which promotes a more efficient cutting action.

Fig. 9 shows another slightly modified form of the milling cutter. This embodiment differs only in that the cylindrical surface of the bar is slightly relieved behind the longitudinal cutting edge 24b as indicated by the numeral 52. For most cutting operations, it is usually not necessary for the longitudinal cutting edge to be relieved as shown in Fig. 9, but for certain kind of operations and for larger diameter milling cutters, this relief provides advantages which will be understood. It will be appreciated that the generally longitudinally extending cutting edges of both cutters 10 and 10a may be relieved as shown in Fig. 9.

While the preferred embodiments of the present inveniton have been shown and described herein, it is obvious that many structural details may be changed without departing from the spirit and scope of the appended claims.

For example, both ends of the cutter bar may be formed so as to provide end cutting edges. Thus, when one end becomes dull the cutter may be reversed to utilize the opposite end so as to increase the length of time the cutter may be used before resharping as required.

The invention is claimed as follows:

1. In combination, a rotary cutter comprising an elongated body having a longitudinally extending groove therein, a longitudinally split one piece cylindrical collet of substantially uniform transverse cross-sectional shape throughout its length and having an aperture therethrough receiving a portion of said body, said collet having adjacent but spaced apart longitudinally extending edges, said collet being resiliently radially collapsible for gripping said body portion, longitudinally extending groove means in said collet and circumferentially spaced from said edges for facilitating collapsing of the collet for gripping said body portion, and an axially extending pin disposed within said collet and within a portion of said groove within said body portion and having a transverse cross sectional shape complementary to the cross sectional shape of said body portion so that said pin and said body portion have a combined cross section similar to that of said aperture for preventing undue collapsing of portions of the collet overlying said groove portion.

2. A combination, as defined in claim 1, wherein said aperture in the collet is eccentrically disposed, a side wall portion of said collet at one side of the eccentric aperture being thinner than other side wall portions of the collet, said thinner side wall portion being split entirely therethrough and longitudinally thereof for providing said edges, and said other collet side wall portions having said groove means therein spaced from said thinner side wall portion.

3. A combination, as defined in claim 1, wherein said groove in said elongated body is disposed substantially entirely at one side of a plane including the longitudinal axis of said elongated body and extends throughout the length of said elongated body, said groove intersecting a peripheral surface of said elongated body to provide a longitudinally extending cutting edge, and one end of said elongated body having surface portions intersecting said longitudinally extending cutting edge and the groove surface and providing an end cutting edge at the intersection of said end surface portion and the groove surface, said elongated body having a substantially uninterrupted cylindrical surface except for said groove.

4. A combination, as defined in claim 3, wherein said longitudinally extending groove and said longitudinally cutting edge are helically disposed.

5. A combination, as defined in claim 3, wherein said cylindrical surface is relieved substantially at said longitudinal cutting edge.

6. A combination, as claimed in claim 1, wherein the groove in the cutter body presents a substantially arcuate groove surface intersecting the peripheral surface of the cutter body to provide a pair of generally longitudinally extending edges, one end of said cutter body having a first surface portion intersecting one of said longitudinal edges and said groove surface with an end cutting edge being provided at the intersection of said first surface portion and said groove surface, said first surface portion being disposed in a plane inclined axially inwardly from said one longitudinally extending edge and rearwardly from said end cutting edge at relatively small angles, a second end surface portion intersecting the other longitudinally extending edge, said groove surface and said first surface portion; said second end surface portion being inclined axially inwardly at a relatively large angle from said first surface portion, and a third surface portion intersecting said first surface portion rearwardly of said end cutting edge and inclined axially inwardly at a relatively large angle from said first surface portion.

References Cited in the file of this patent

UNITED STATES PATENTS

| | | |
|---|---|---|
| 1,235,604 | Royle | Aug. 7, 1917 |
| 1,907,880 | Royle | May 9, 1933 |
| 2,037,304 | Baxendale | Apr. 14, 1936 |
| 2,349,959 | Guetzkow | May 30, 1944 |
| 2,529,157 | Higerd | Nov. 7, 1950 |
| 2,678,826 | Nick | May 18, 1954 |
| 2,690,703 | Creek | Oct. 5, 1954 |
| 2,695,787 | Sunnen | Nov. 30, 1954 |
| 2,718,689 | Mason et al. | Sept. 27, 1955 |